US009216536B2

(12) United States Patent
Canfield et al.

(10) Patent No.: US 9,216,536 B2
(45) Date of Patent: Dec. 22, 2015

(54) PISTON-BASED EXTRUSION FOR VISCOUS PRODUCTS

(71) Applicant: Kolmar Labs Group, Inc., Port Jervis, NY (US)

(72) Inventors: Michael Joseph Canfield, Sparrowbush, NY (US); Allen Joseph DeGarmo, Matamoras, PA (US); Jeffrey William Swaine, Otisville, NY (US); Craig Robert Onofry, Port Jervis, NY (US)

(73) Assignee: Kolmar Laboratories, Inc., Port Jervis, NY (US)

( * ) Notice: Subject to any disclaimer, the term of this patent is extended or adjusted under 35 U.S.C. 154(b) by 115 days.

(21) Appl. No.: 14/158,374

(22) Filed: Jan. 17, 2014

(65) Prior Publication Data

US 2015/0202812 A1    Jul. 23, 2015

(51) Int. Cl.
  *B65B 1/00*   (2006.01)
  *B29C 47/54*  (2006.01)
  *A45D 40/00*  (2006.01)
  *B29C 31/00*  (2006.01)
  *B30B 11/22*  (2006.01)
  *B29C 47/34*  (2006.01)

(52) U.S. Cl.
  CPC ............... *B29C 47/54* (2013.01); *A45D 40/00* (2013.01); *B29C 31/00* (2013.01); *B30B 11/22* (2013.01); *B29C 47/34* (2013.01)

(58) Field of Classification Search
  CPC  B30B 15/304; B28B 13/023; B28B 13/0215; B28B 3/02; B65D 83/0005
  See application file for complete search history.

(56) References Cited

U.S. PATENT DOCUMENTS

| | | | | |
|---|---|---|---|---|
| 1,303,218 | A | * | 5/1919 | Esselmann ..................... 222/387 |
| 2,602,578 | A | * | 7/1952 | Carruthers ....................... 141/81 |
| 3,670,552 | A | | 6/1972 | Kaspers |
| 4,054,967 | A | * | 10/1977 | Sandberg et al. .............. 426/512 |
| 4,302,173 | A | * | 11/1981 | Persson ..................... 425/192 R |
| 4,387,633 | A | | 6/1983 | Ballantyne |
| 4,693,397 | A | | 9/1987 | Lang |
| 4,792,298 | A | * | 12/1988 | Tastet ............................ 425/239 |
| 5,063,057 | A | * | 11/1991 | Spellman et al. .............. 424/401 |

(Continued)

FOREIGN PATENT DOCUMENTS

| | | | |
|---|---|---|---|
| DE | 2346070 | * | 3/1975 |
| GB | 1 053 709 | | 1/1967 |
| GB | 2 107 638 A | | 5/1983 |

OTHER PUBLICATIONS

Electronic translation of DE 2346070.*

*Primary Examiner* — Jill Heitbrink
(74) *Attorney, Agent, or Firm* — Andrus Intellectual Property Law, LLP

(57) ABSTRACT

A system for preparing a dry viscous material for packaging comprises a tank containing the dry viscous material, the tank having a nozzle at one end. A piston in the tank is configured to exert pressure on the dry viscous material in order to extrude the dry viscous material through the nozzle. A mold is movably positioned at a first position at an exit end of the nozzle, the mold having rigid sides surrounding a hollow and configured to accept the dry viscous material extruded from the nozzle so as to form the dry viscous material into a molded portion. A mold moving mechanism is configured to move the mold from the first position to a second position once a predefined amount of dry viscous material is received therein. Finally, an ejection mechanism is configured to remove the molded portion from the mold at the second position.

15 Claims, 5 Drawing Sheets

(56) References Cited

U.S. PATENT DOCUMENTS

| | | | |
|---|---|---|---|
| 5,182,120 A * | 1/1993 | Kusters et al. | 425/238 |
| 5,855,233 A * | 1/1999 | Bolelli | 141/144 |
| 6,098,675 A * | 8/2000 | Runft | 141/81 |
| 7,426,815 B1 * | 9/2008 | Wilson et al. | 53/527 |
| 7,661,447 B2 * | 2/2010 | Bailey et al. | 141/12 |
| 8,151,830 B2 * | 4/2012 | Schmied et al. | 141/83 |
| 2006/0231436 A1 | 10/2006 | Spinks et al. | |
| 2010/0232996 A1 | 9/2010 | Stabel | |

* cited by examiner

PISTON-BASED EXTRUSION FOR VISCOUS PRODUCTS

FIELD

The present application is directed to the field of piston-based extrusion. More specifically, the present application is directed to extrusion of high viscosity, dry materials.

BACKGROUND

Existing systems and methods are available for preparing and packaging flowable viscous liquid, such as gels and flowable pastes. For example, in the cosmetic industry systems and methods are available for preparing and packaging thick, flowable cosmetics such as lip glosses and mascaras. However, existing systems and methods are not capable of dosing non-flowable, dry viscous material in its final state so that the material can be packaged immediately. Many dry, high viscosity materials, such as non-flowable clays and pastes, do not lend themselves to pumping via screw augers or standard piston pump systems. This is especially true for high viscosity materials with low internal adhesion, or tensile strength, such as relatively dry, fragile masses. Such dry and viscous materials cannot be dosed with a standard pick and fill system and cannot be pumped directly into the final packing component or container. Existing products of these textures are often liquefied, dispensed as a flowable slurry, and then thickened, wherein the desired texture is achieved over time by allowing volatile ingredients to evaporate.

SUMMARY

The inventors recognize that prior art systems and methods are incapable of preparing dry viscous materials for packaging, especially if the high viscosity items are relatively dry, fragile masses of low tensile strength. The inventors developed the present system and method in order to make this type of highly viscous product commercially feasible. As used herein, the term "dry viscous material" refers to non-flowable materials having a viscosity greater than 100,000 centipoise (cP) at 21° C. (70° F.) and having a low internal adhesion, with a tensile strength in the range of 300-3000 pascals (Pa). Dry viscous material includes, but is not limited to, paste, putty, clay, and gel-powder mixtures, and particularly dry versions of such material with low internal adhesion or tensile strength. For example, dry viscous materials include slurry-powder hybrids and very thick, gel-based products. Such material is useful, for example, in the cosmetics industry. However, prior art systems typically used for cosmetics, such as auger-fed hoppers and standard piston fillers, are incapable of dosing such material because it is too viscous and fragile.

Thus, the inventors recognized that a system and method needed to be developed that allows dosing of highly viscous, low tensile strength material in ready-to-use form and does not require evaporation, or flashing off, of volatile ingredients to yield a desired texture. Further, the inventors recognized that such system and method preferably prepares and packages the dry viscous material at room temperature, such that the material is dosed into packaging containers in its final state.

In one embodiment, a system for preparing a dry viscous material for packaging comprises a tank containing the dry viscous material, the tank having a nozzle at one end. A piston in the tank is configured to exert pressure on the dry viscous material in order to extrude the dry viscous material through the nozzle. A mold is movably positioned at a first position at an exit end of the nozzle, the mold having rigid sides surrounding a hollow and configured to accept the dry viscous material extruded from the nozzle so as to form the dry viscous material into a molded portion. A mold moving mechanism is configured to move the mold from the first position to a second position once a predefined amount of dry viscous material is received therein. Finally, an ejection mechanism is configured to remove the molded portion from the mold at the second position.

A method for preparing a dry viscous material for packaging comprises exerting pressure on the dry viscous material in a tank, the tank having a nozzle at one end and a piston at the opposing end, wherein the piston extrudes the dry viscous material out of the nozzle into a mold. Once a predetermined amount of the dry viscous material is received in the mold, the mold is moved such that the mold separates the dry viscous material in the mold from the dry viscous material in the nozzle, thereby to form a molded portion of dry viscous material. The molded portion is then ejected out of the mold and onto a receiving surface.

In another embodiment, a system for packaging dry viscous material comprises a tank containing dry viscous material, the tank having a nozzle at one end. A piston in the tank is configured to exert pressure on the dry viscous material in order to extrude the dry viscous material through the nozzle. A stationary bottom plate is positioned below the nozzle, and a mold is movably positioned in a first position between a stationary bottom plate and the nozzle. The mold has rigid sides surrounding hollow with the stationary bottom plate forming a bottom surface of the hollow when the mold is in the first position. The mold is configured to receive the dry viscous material extruded from the nozzle so as to form the dry viscous material into a molded portion. A mold moving mechanism is configured to move the mold off of the stationary bottom plate to a second position once a predefined amount of the dry viscous material is received therein such that when the mold is in the second position there is no bottom surface to the hollow. Furthermore, the system is configured such that when the mold moves from the first position to the second position it separates the molded portion from the dry viscous material in the nozzle. An ejection mechanism is configured to eject the molded portion out of the mold and onto a receiving surface.

DETAILED DESCRIPTION OF THE DRAWINGS

Figure 1:
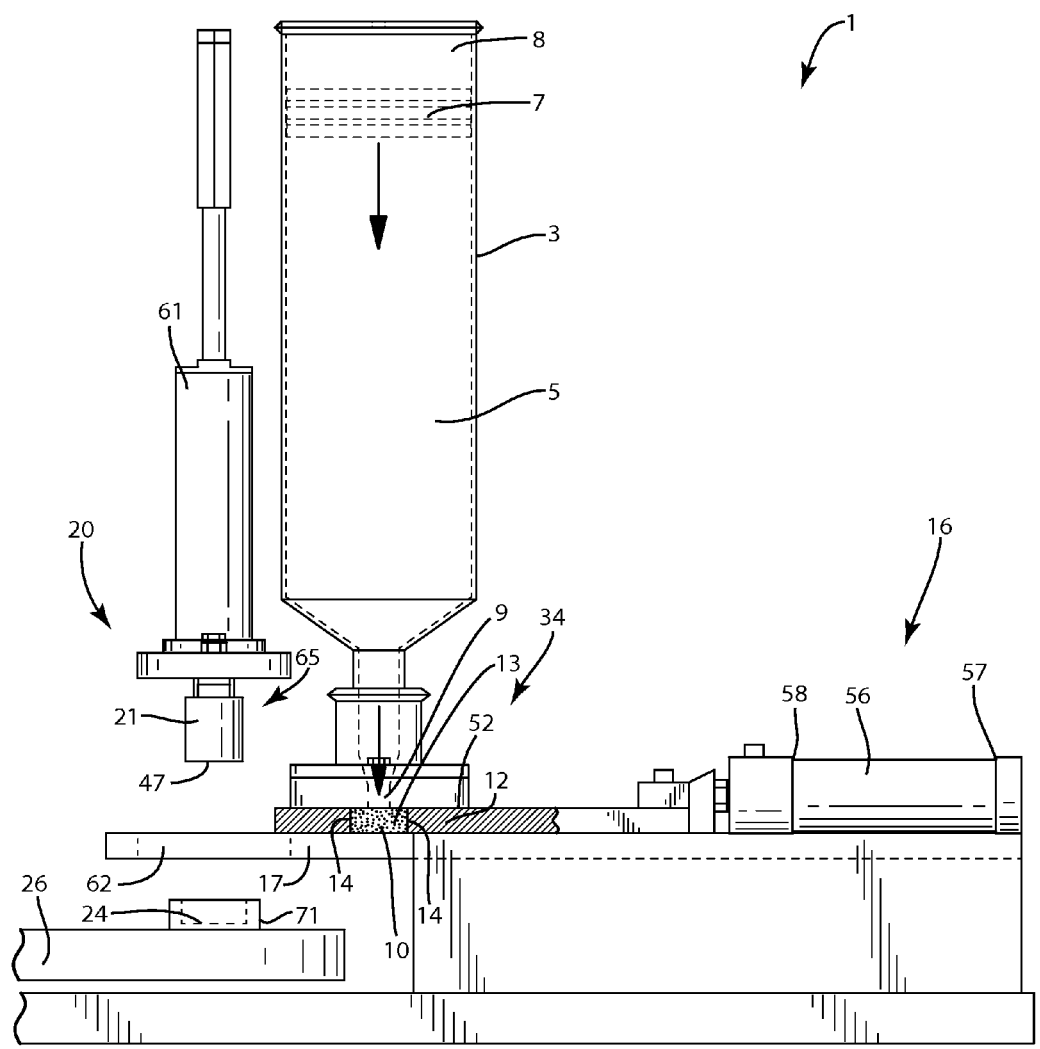
FIG. 1 depicts an exemplary embodiment of a system and method for preparing dry viscous material for packaging.

FIGS. 1-5 demonstrate systems and methods for preparing and packaging a dry viscous material. As used herein, the term "dry viscous material" refers to non-flowable materials having a viscosity greater than 100,000 centipoise (cP) at 21° C. (70° F.) and having a low internal adhesion, with a tensile strength in the range of 300-3000 pascals (Pa). The dry viscous material may be dilatant, Newtonian, or thixotropic. The dosing system 1 and method for preparing a dry viscous material for packaging depicted in FIGS. 1-4 generally includes a tank 3 including a dry viscous material 5. A piston 7 is forced down through the tank 3 pushing the dry viscous material 5 out of the nozzle 9 of the tank into a hollow 13 of a mold 12. The nozzle 9 may be any device appropriate for or configured to insert the dry viscous material 5 into the mold 12. For example, the exit end of the nozzle 9 preferably has a smaller cross-sectional area than that of the hollow 13 of the mold. The mold 12 is movable by a mold moving mechanism 16, which pushes the mold from a first position 34 underneath the tank 3 to a second position 35 underneath the ejection mechanism 20. The ejection mechanism 20 ejects the molded portion 10 of the dry viscous material 5 from the mold 12. The ejected molded portion 10 falls onto a receiving surface 24, which is on a conveyor system 26. After the molded portion 10 is ejected onto receiving surface 24 and the mold 12 is cleared, the mold 12 returns to the first position 34 to be refilled and create the next molded portion 10.

Referring to FIG. 1, a tank 3 contains dry viscous material 5. At one end of the tank is a nozzle 9, through which the dry viscous material 5 is extruded. A piston 7 at the opposite end of the tank 3 is configured to apply pressure to the dry viscous material 5 in the tank 3 in order to extrude the dry viscous material 5 out of the nozzle 9. In one embodiment, the piston is controlled by a gas pump that inserts gas into the piston end 8 of the tank 3 to exert pressure on the piston 7. For example, gas may be steadily pumped into the piston-end 8 of the tank 3 so as to apply a consistent pressure on the dry viscous material 5, in other words to push the piston towards the nozzle-end of the tank to extrude the dry viscous material 5.

The pressure on the piston 7 controls the speed of the extrusion out of the nozzle. Thus, the pressure on the piston 7 may be set based on the speed at which the user wishes to dose the dry viscous material 5. In one exemplary embodiment, 15 pounds of pressure is consistently applied to the piston 7 to extrude the dry viscous material 5 out of the nozzle 9. Any method or system may be used to impart motion of the piston. In other embodiments not depicted, the piston 7 may be connected via a rod to a pump, such as a hydraulic pump or an electric pump, which imparts force on the piston 7 to extrude the dry viscous material 5.

The material is extruded out of the nozzle 9 into the hollow portion 13 of a mold 12. The hollow 13 of the mold 12 has rigid sides 14 configured to receive the dry viscous material 5 that is extruded and to form the dry viscous material into a molded portion 10 dictated by the form of the mold 12. The rigid sides 14 are able to withstand the pressure placed on the dry viscous material 5, and should be able to withstand at least the amount of pressure placed on the piston 7. In one embodiment, the mold 12 is a dosing plate with a cylindrical hole therethrough, which serves to receive the extruded dry viscous material 5 to create a puck-shaped molded portion 10. Further describing the example, the puck-shaped molded portion 10 may be ½ inch high and 1 to 2 inches in diameter. But, the mold 12 and the corresponding molded portion 10 may take any shape or size and is not confined to such example.

In the embodiment depicted in FIG. 1, the mold 12 is positioned on a stationary bottom plate 17. In the depicted embodiment, the stationary bottom plate 17 is positioned below the nozzle 9, with the mold 12 in between the bottom plate 17 and the nozzle 9. The mold 12 is placed above the bottom plate 17 such that the bottom plate 17 forms the bottom side of the hollow 13 of the mold 12 and supports the dry viscous material 5 during the extrusion and molding process.

The mold 12 may be movably positioned at the exit end of the nozzle 9 so that the dry viscous material 5 is dosed directly into the mold 12. This is the first position 34 of the mold 12. The mold 12 is connected to a mold moving mechanism 16 configured to move the mold from its first position 34, where the hollow 13 is filled with the heavy viscous material 5 to a second position 35 where the molded portion 10 of the dry viscous material 5 is removed from the mold 12. The second position 35 of the mold 12 is illustrated in FIGS. 2 and 3.

The mold 12 is moved from its first position 34 to its second position 35 by a mold moving mechanism 16 when the hollow 13 reaches a predetermined fill level of the dry viscous material 5. The mold moving mechanism 16 may be any mechanism capable of moving the mold 12 from a position under the extruder to a position where the molded portion 10 is removed from the mold 12. In one embodiment, the mold moving mechanism 16 is a pneumatic cylinder, which uses the power of compressed gas to produce a force in a reciprocating linear motion between the first position 34 and the second position 35. In the pneumatic cylinder embodiment, the mold moving mechanism 16 includes a cylinder 56 having a piston therein, with a rod connected between the piston and the mold 12 and configured to transfer the motion of the piston into motion of the mold 12. Standard pneumatic cylinders, or air cylinders, may be employed, where compressed air enters into the cylinder 56 at the first end 57. The compressed air imparts a force on the piston forcing the piston away from that first end 57. The system can then be reversed to move the piston back towards the first end 57 of the cylinder. In one embodiment, the working portion of the cylinder 56 has a length equal to the distance between the first position 34 and the second position 35, such that when the piston moves from the first end 57 to the second end 58 of the cylinder the mold is moved from the first position 34 to the second position 35. Likewise, when the piston is moved from the second end 58 back to the first end 57, the mold is moved from the second position 35 back to the first position 34.

In the embodiment depicted in FIG. 1, the bottom plate 17 is configured such that it provides a bottom surface to the mold 12 when the mold 12 is in the first position 34. Thus, when the mold 12 is in the second position 35, there is no bottom surface below the mold. This allows the molded portion 10 to be removed from the mold 12 by pushing on the top surface of the molded portion 10 to expel the molded portion 10 out the bottom of the mold 12. In the embodiment depicted in FIG. 1, the bottom plate 17 has an exit hole 62 below the hollow 13 of the mold 12 when the mold is in the second position 35. The exit hole 62 is at least as large as the hollow 13 so that the molded portion 10 may be pushed out of the bottom of the mold through the exit hole 62. Preferably, the exit hole 62 is larger than the hollow 13, to allow room for error in alignment between bottom plate 17 and the mold 12, and so that the molded portion 10 can be pushed out through the exit hole 62 without hitting the edges thereof.

Figure 2:
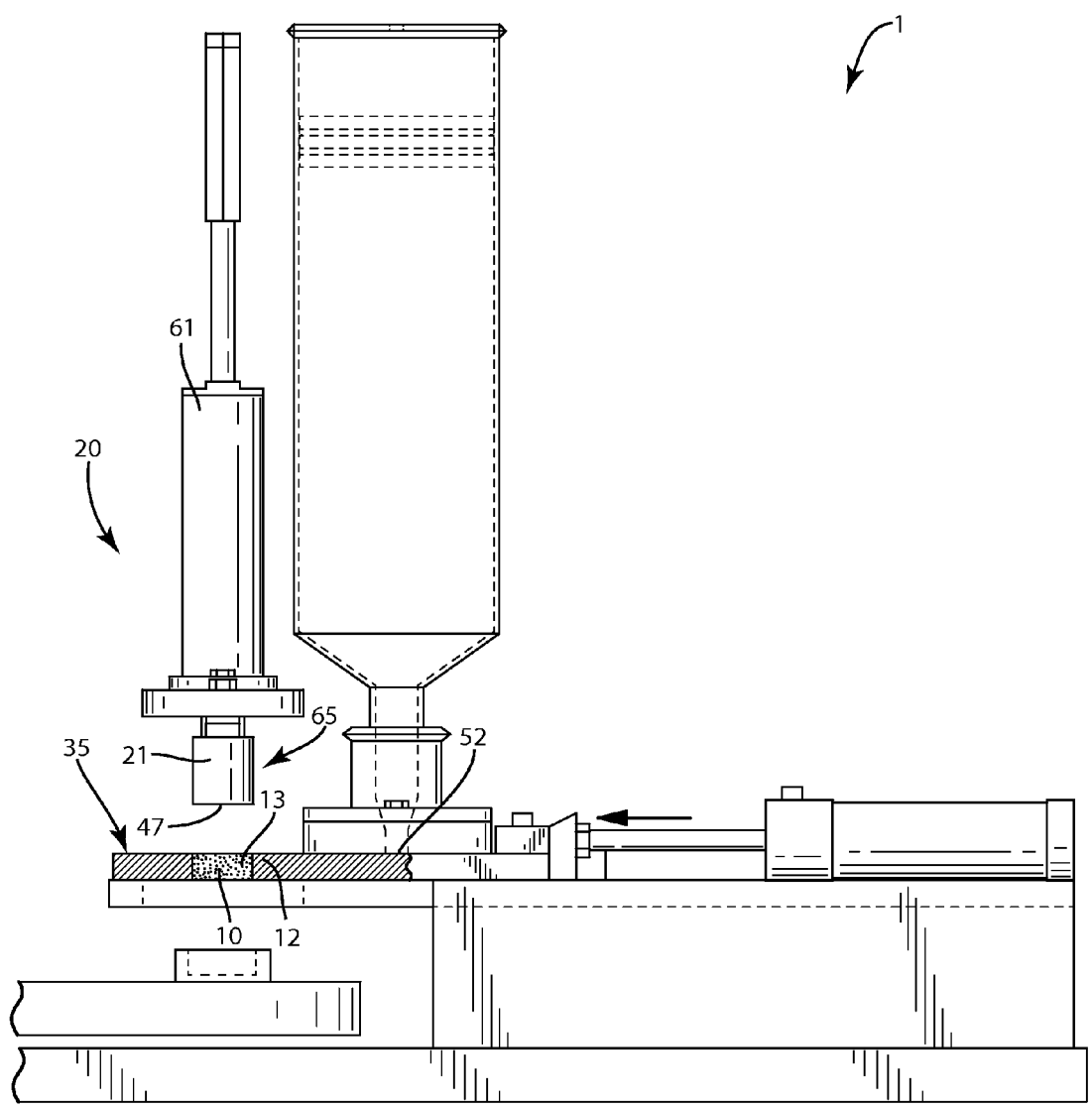
FIG. 2 provides another depiction of the exemplary system and method for preparing dry viscous materials for packaging of FIG. 1.
Figure 3:
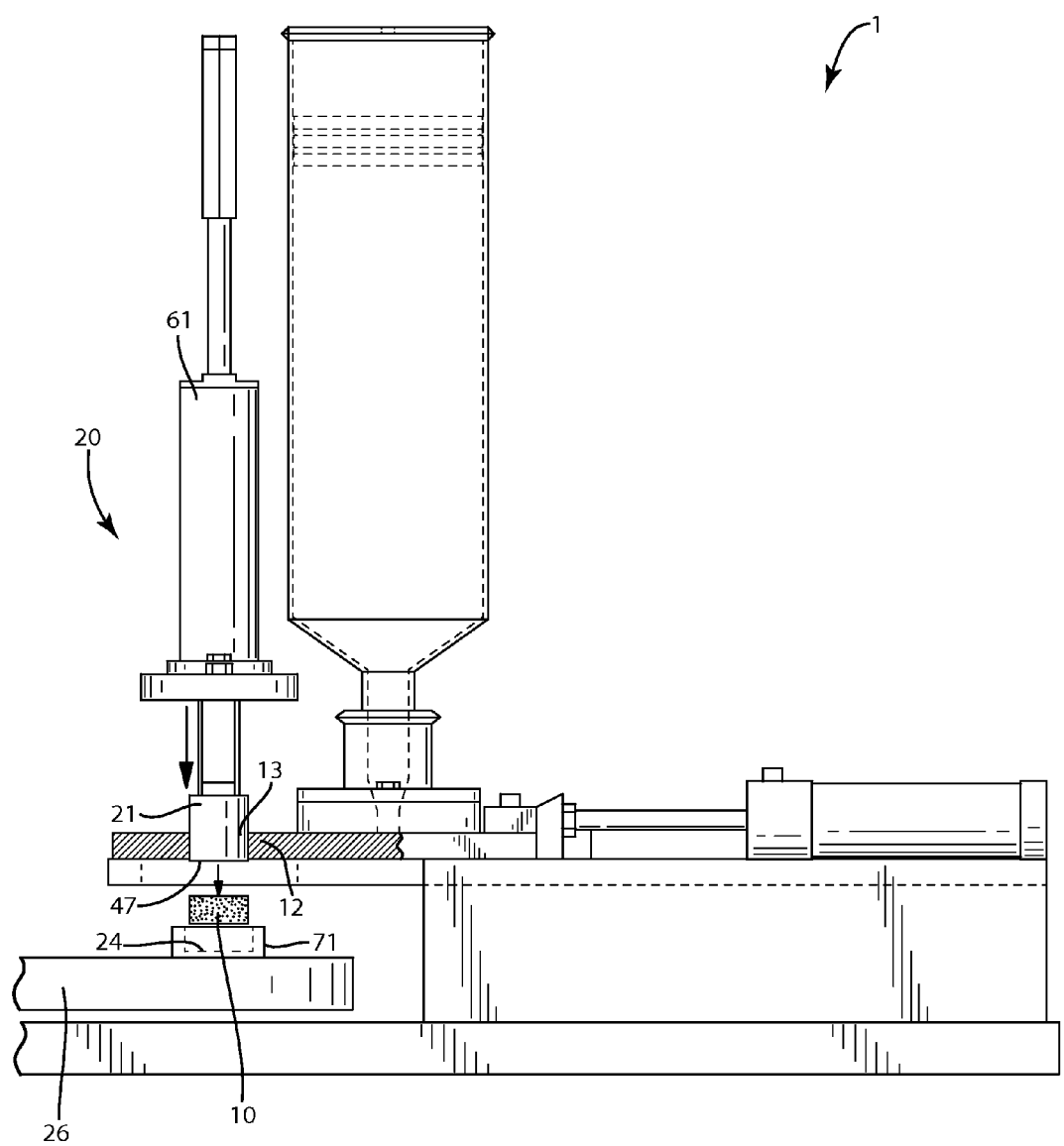
FIG. 3 provides another depiction of the exemplary system and method for preparing dry viscous materials for packaging of FIG. 1.

Turning to FIG. 2, the mold 12 is moved into a second position 35 once the predetermined fill amount in the hollow 13 has been reached. The mold may be deemed filled and moved to the second position 35 when a predetermined amount of material has been placed in the mold. The predetermined amount of material to be inserted into the mold 12 may be determined based on the volume of the hollow 13, such as when the hollow 13 is above the bottom plate 17. The amount of material extruded into the hollow 13 may be measured based on, for example, the extrusion rate of the dry viscous material 5 from the tank and the amount of time that the dry viscous material 5 is extruded. In such an embodiment, the extrusion rate of the dry viscous material 5 is known, or is determined based on the pressure on the piston 7. The amount of time that the mold spends in the first position 34 may then be calculated based on the extrusion rate, wherein the mold 12 is moved to its second position 35 when the volume of material extruded reaches the predetermined value.

In an alternative embodiment, a pressure sensor may be placed in the hollow 13 to determine when the hollow 13 has been filled with the dry viscous material 5. In such an embodiment, the mold 12 can be moved from the first position 34 to the second position 35 when the pressure in the hollow 13 reaches a predefined level indicating that the mold is full. Such an embodiment may be especially useful if the pressure on the piston 7 is inconsistent or is unknown, such that the extrusion rate of the dry viscous material 5 out of the nozzle 9 is inconsistent and/or is unknown. Such an embodiment may also be useful where the dry viscous material 5 is packed inconsistently within the tank 3 such that the extruded material has variable densities and/or air pockets.

As the mold moves from a first position 34 to a second position 35, as illustrated between FIGS. 1 and 2, the mold 12 may slide against the nozzle 9 to cut or separate the dry viscous material 5 in the molded portion 10 from the dry viscous material 5 remaining in the nozzle 9. In the embodiment of FIGS. 1-3 where the mold 12 is a dosing plate, the top side 52 of the mold 12 may slide against the nozzle 9 and act as a stop to prevent the dry viscous material 5 from being extruded out of the nozzle 9 when the mold 12 is not in the first position 34.

In the second position, the molded portion 10 is removed from the mold 12 for further processing and/or packaging. In the embodiment of FIGS. 1-3, the ejection mechanism 20 is an adjustable stroke pneumatic cylinder 61 affixed to a plunger 21 and configured to move the plunger 21 to eject the molded portion 10 out of the mold 12. In the exemplary embodiment of FIG. 3, the air cylinder 61 may be configured to move the plunger 21 from a retracted plunger position 65 (illustrated in FIGS. 1-2) down into the hollow 13 of the mold 12. Preferably, the plunger 21 is sized to be just slightly smaller than the hollow 13 so that the plunger 21 extends to the edges of the hollow 13 to eject the entire molded portion 10 therefrom. In such an embodiment, the plunger 21 may make contact with the rigid sides 14 of the hollow to prevent significant buildup of material on the edges of the hollow 13. In one embodiment, the system may be configured such that the plunger 21 extends to a position where the plunger edge 47 is approximately equal to the bottom edge of the mold 12. Thereby, the plunger may cleanly remove the entire molded portion 10, in other words all of the dry viscous material in the mold.

The molded portion 10 may then fall onto the receiving surface 24. The receiving surface may be a flat surface, such as a plate, or it may be a container 71 configured to receive and contain the molded portion 10. In the embodiment of FIG. 3, the container 71 is shaped similarly to the molded portion 10 and is just slightly larger than the molded portion 10. For example, the container 71 may be a cosmetic container designed to package a highly viscous cosmetic material. The container 71 may be on a conveying system 26 designed such that an empty container 71 is moved under the ejection mechanism 20, a molded portion 10 is dropped therein, and then the container containing the molded portion is moved for further processing.

In one embodiment, the plunger 21 extends down into the container 71 such that the plunger edge 47 pushes against the top of the molded portion 10. In such an embodiment, the plunger may cause the molded portion 10 to form to the container 71, causing the thy viscous material 5 of the molded portion 10 to spread to and fill the sides of the container 71. In such an embodiment, the plunger may also have a finishing effect on the molded portion 10 by smoothing out the top and further forming the molded portion 10 into the container 71. In another embodiment, the conveying system 26 may carry the container 71 to a second location for finishing. For example, a second plunger may exist at such second location to press on the top of the molded portion and cause the molded portion to form to the container 71. Such an embodiment may have the added benefit of making the system 1 slightly faster by reducing the amount of time that the mold 12 spends at the second position 35 and reducing the overall cycle time of the system.

The pressure on the piston 7 and the extrusion rate may be controlled based on the desired dosing rate, such as the rate at which the conveyor system 26 is conveying the containers 71 for filling. Conversely, the rate of the conveyer system 26 may be controlled based on the extrusion rate, which is to say based on the pressure on the piston 7.

A container may be any container capable of providing a receiving surface 24 for the molded portion 10. Furthermore, the receiving surface may alternatively be a plate or may be a surface of a conveyor. In such an embodiment, after the molded portion 10 is received on the receiving surface 24 the conveying system 26 may move the molded portion 10 to a position for further processing, such as for packaging.

The cylinder 61 of the ejection mechanism 20 may be an air cylinder, such as described above with respect to the cylinder 56 of the mold moving mechanism 16. In other embodiments, the ejection mechanism 20 capable of ejecting the molded portion 10 on the mold 12.

Figure 4:
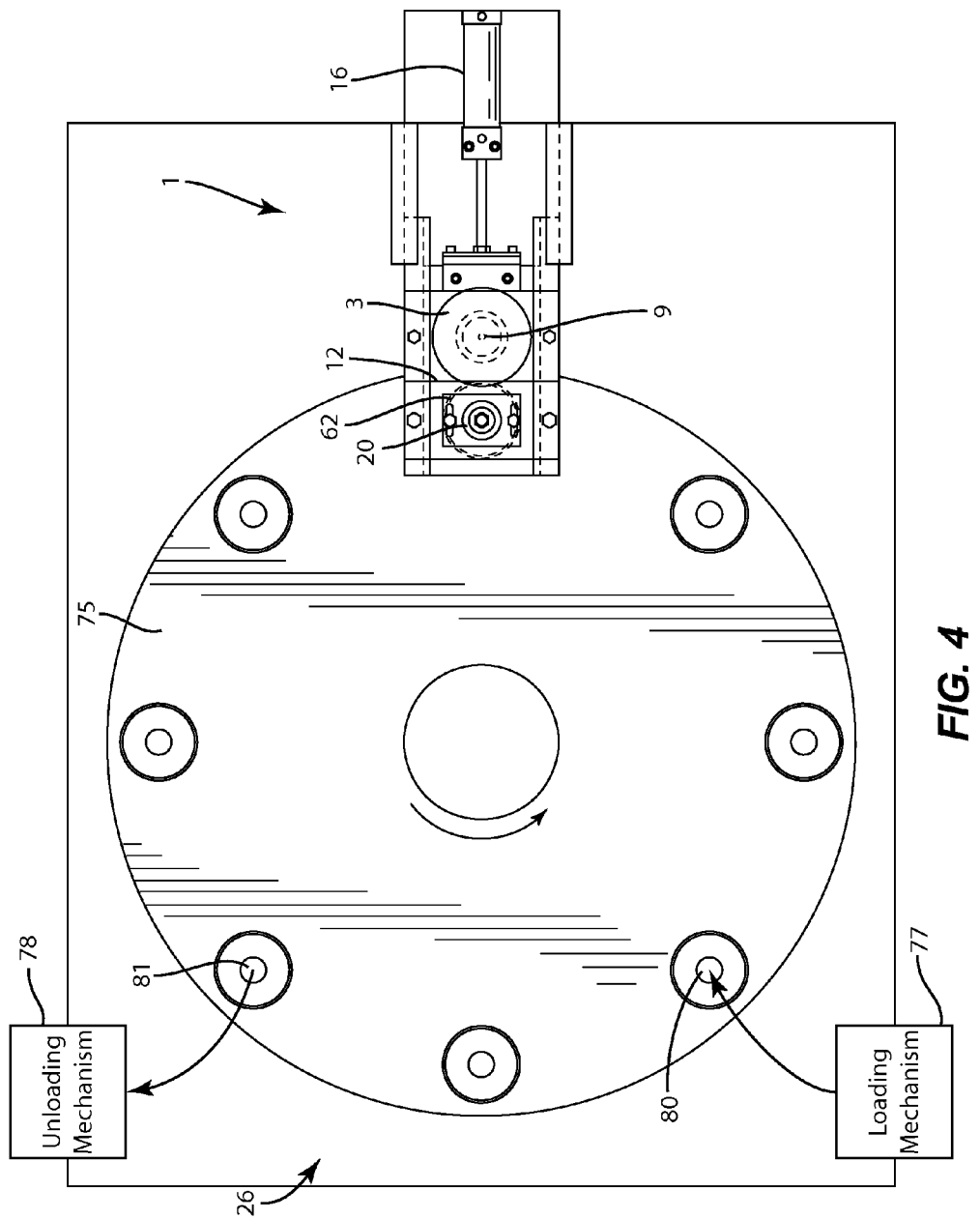
FIG. 4 depicts one exemplary system for preparing and packaging dry viscous materials including a conveying system.

In the embodiment depicted in FIG. 4, the conveyor system 26 is a rotary table 75 configured to rotate in a clockwise direction to move containers 71 under the ejection mechanism 20 so that molded portion can be inserted therein. The rotary table 75 may be configured to convey receiving surfaces 24, such as containers 71, from a loading point 80 to an unloading point 81. Between the loading point 80 and the unloading point 81, the dosing system 1 inserts a molded portion 10 into each container. As described above, the system may further include a famishing station, which may be positioned after the dosing system 1 on the rotary table.

A loading mechanism 77 may be positioned to load empty containers 71 onto the loading point 80 of the rotary table 75. The loading mechanism may be any mechanism known in the art for loading containers onto a conveying system 26, such as a rotary table 75. For example, one exemplary loading mechanism may be a PLC (programmable logic controller) controlled pick and place mechanism or computer controlled robotic arm loading system. Alternatively, the loading mechanism may not be an automatized loading mechanism, but may be a person loading empty containers 71 onto the loading point 80 of the rotary table 75.

Likewise, the unloading mechanism may be any mechanism known in the art for unloading filled containers 71 from a conveying system 26, such as a rotary table 75. In one exemplary embodiment, the unloading mechanism is capable of accurately picking up filled containers 71 from conveying system 26 and placing them on a separate conveying system with a high level of repeatability. Alternatively, the unloading mechanism 78 may be a person tasked with unloading the filled containers 71 from the unloading point 81 of the rotary table 75.

FIG. 4 demonstrates one exemplary embodiment of the conveying system 26, which may comprise part of the present system and method for preparing and packaging dry viscous materials. In other embodiments, the conveying system 26 may be a line conveyor, or any other conveying system known in the art. In still other embodiments, the system and method may not include any conveying system. For example, the dosing system 1 may be mobile, such as on a track, and may be moved so as to dose molded portion 10 onto receiving surfaces 24, which may be stationary.

Figure 5:
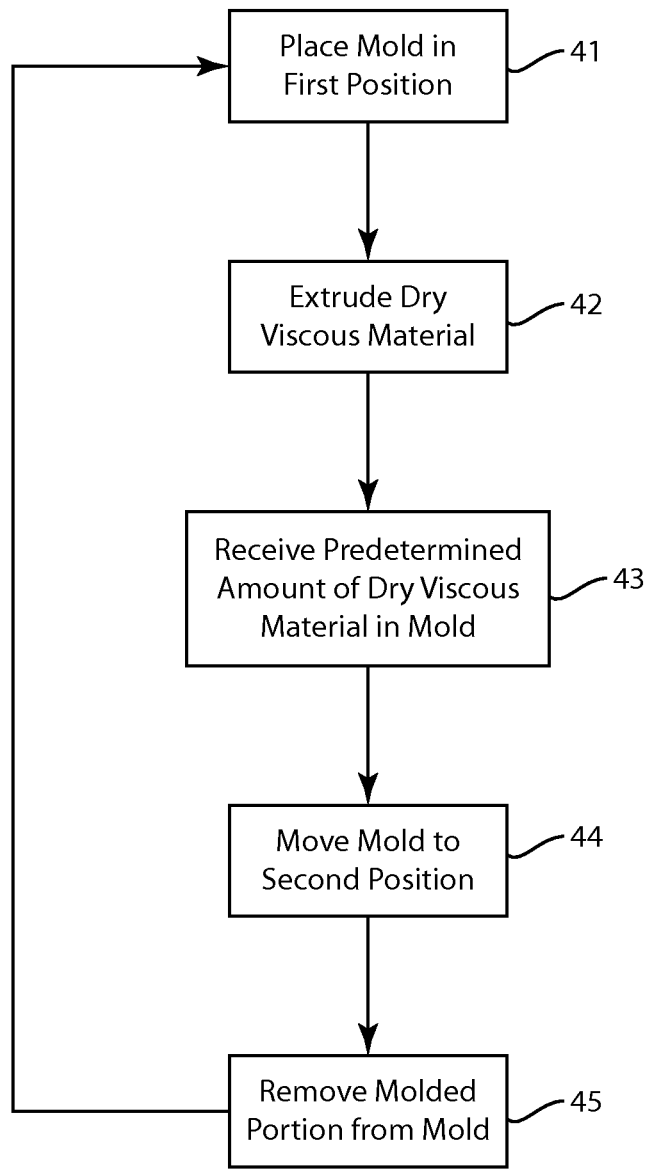
FIG. 5 is a flowchart depicting one embodiment of a method for preparing dry viscous materials for packaging.

FIG. 5 demonstrates one exemplary method for preparing dry viscous material for packaging. At step 41, the mold is placed in a first position, for example underneath the nozzle-end of the tank 3. The dry viscous material is then extruded into the mold, for example via a piston exerting pressure on the dry viscous material in a tank to extrude the tank out of a nozzle directly about the mold. Once a predetermined amount of dry viscous material is received in the mold at step 43, the mold is moved to a second position at step 44. There, the molded portion of dry viscous material is removed from the mold at step 45. The mold is then returned to the first position to restart the process at step 41.

This written description uses examples to disclose the invention, including the best mode, and also to enable any person skilled in the art to make and use the invention. The patentable scope of the invention is designed by the claims, and may include other examples that occur to those skilled in the art. Such other examples are intended to be within the scope of the claims if they have structural elements and/or method steps that to not differ from the literal language of the claims, or if they include equivalent structural elements and/ or method steps with insubstantial differences from the literal languages of the claims.

The invention claimed is:

1. A system for preparing a dry viscous material for packaging, the system comprising:
   a tank containing the dry viscous material tank having a tapered nozzle at one end;
   a piston in the tank configured to exert pressure on the dry viscous material in order to extrude the dry viscous material through the nozzle;
   a mold movably positioned at a first position at an exit end of the nozzle, the mold having rigid sides surrounding a hollow and configured to accept the dry viscous material extruded from the nozzle so as to form the dry viscous material into a molded portion;
   a mold moving mechanism configured to move the mold, once a predefined amount of the dry viscous material is received therein, from the first position to a second position;
   a stationary bottom plate positioned directly below the hollow when the mold is in the first position such that the bottom plate forms a bottom surface of the hollow;
   wherein when the mold is moved to the second position the hollow slides off of the bottom plate such that there is no bottom surface of the hollow when the mold is in the second position;
   an ejection mechanism configured to remove the molded portion from the mold at the second position
   wherein the ejection mechanism includes a plunger configured to be inserted into the hollow to push the molded portion out of the mold; and
   a container positioned below the plunger such that when the plunger pushes the molded portion out of the mold the molded portion falls into the container.

2. The system of claim 1, wherein the system is configured such that when the mold moves from the first position to the second position a portion of the mold slides against the nozzle to separate the molded portion from the dry viscous material in the nozzle.

3. The system of claim 1, wherein the ejection mechanism is further configured to extend the plunger into the container to press on a top surface of the molded portion to push the molded portion into the container.

4. The system of claim 1, further comprising a conveyor positioned below the ejection mechanism such that when the ejection mechanism removes the molded portion front the mold the molded portion falls onto the conveyer.

5. The system of claim 1, further comprising a rotary table positioned below the ejection mechanism such that when the ejection mechanism removes the molded portion from the mold the molded portion falls onto the rotary table.

6. The system of claim 1, wherein the mold moving mechanism is a pneumatic cylinder connected to the mold and configured to move the mold in a reciprocating linear motion between the first position and the second position.

7. The system of claim 1, wherein the mold is circular and the molded portion is puck shaped.

8. A method for preparing a dry viscous material for packaging, the method comprising:
   exerting pressure on the dry viscous material in a tank, the tank having a tapered nozzle at one end and a piston at the opposing end, wherein the piston extrudes the dry viscous material out of the nozzle into a mold;
   moving the mold once a predetermined amount of the dry viscous material is in the mold, wherein the process of moving the mold separates the dry viscous material in the mold from the dry viscous material in the nozzle to form a molded portion;
   ejecting the molded portion out of the mold and onto a receiving surface
   wherein the step of ejecting the molded portion out of the mold includes pressing on the molded portion with a plunger to push the material out of the mold; and
   wherein the receiving surface is a container positioned below the mold such that when the plunger pushes the molded portion out of the mold the molded portion falls into the container.

9. The system of claim 8, further comprising pressing the molded portion into the container with the plunger causing the molded portion to form to the sides of the container.

10. The method of claim 8, wherein the mold comprises rigid sides surrounding a hollow configured to accept the dry viscous material extruded from the nozzle; and
    wherein the step of moving the mold includes sliding the mold from a first position to a second position, wherein in the first position the hollow of the mold is directly above a bottom plate which forms a bottom surface of the hollow, and wherein when the mold slides to the second position it slides off of the bottom plate such that the plate no longer forms the bottom surface of the hollow.

11. The method of claim 8, wherein the mold is a plate with a hollow configured to receive and form the dry viscous material, and wherein the mold is configured such that when the mold moves from the first position to the second position a top side of the mold slides against the nozzle to separate the molded portion from the dry viscous material in the nozzle.

12. A system for packaging a dry viscous material, the system comprising:
- a tank containing a dry viscous material, the tank having a tapered nozzle at one end;
- a piston in the tank configured to exert pressure on the dry viscous material in order to extrude the dry viscous material through the nozzle;
- a stationary bottom plate positioned below the nozzle;
- a mold movably positioned in a first position between the stationary bottom plate and the nozzle;
  - wherein the mold has rigid sides surrounding a hollow with the stationary bottom plate forming a bottom surface of the hollow when the mold is in the first position; and
  - wherein the mold is configured to receive the dry viscous material extruded from the nozzle so as to form the dry viscous material into a molded portion;
- a mold moving mechanism configured to move the mold off of the stationary bottom plate to a second position once a predefined amount of the dry viscous material is received therein, such that there is no bottom surface of the hollow when the mold is in the second position;
  - wherein the system is configured such that when the mold moves from the first position to the second position it separates the molded portion from the dry viscous material in the nozzle; and
- an ejection mechanism configured to eject the molded portion out of the mold and onto a receiving surface.

13. The system of claim 12, wherein the dry viscous material is a cosmetic and the receiving surface is a cosmetic container.

14. The system of claim 13, further comprising a conveying system for conveying the cosmetic container under the ejection mechanism such that the cosmetic can be inserted into the cosmetic container.

15. The of claim 14, wherein the conveying system is a rotary table configured to transport the cosmetic container from a loading point where an empty container is loaded onto the rotary table to an unloading point where a filled cosmetic container is unloaded from the rotary table.

* * * * *